Jan. 9, 1951 C. S. ASH 2,537,180
VEHICLE WHEEL
Filed June 15, 1946 5 Sheets-Sheet 1

INVENTOR
CHARLES S. ASH
BY
ATTORNEYS

Jan. 9, 1951 C. S. ASH 2,537,180
VEHICLE WHEEL
Filed June 15, 1946 5 Sheets-Sheet 2

INVENTOR
CHARLES S. ASH
BY
Morgan, Finnegan & Durham
ATTORNEYS

Jan. 9, 1951  C. S. ASH  2,537,180
VEHICLE WHEEL
Filed June 15, 1946  5 Sheets-Sheet 3
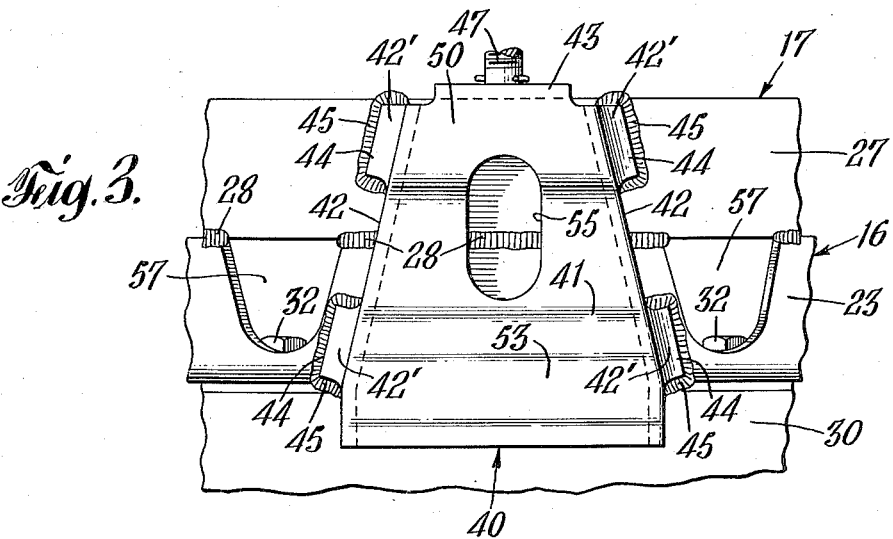
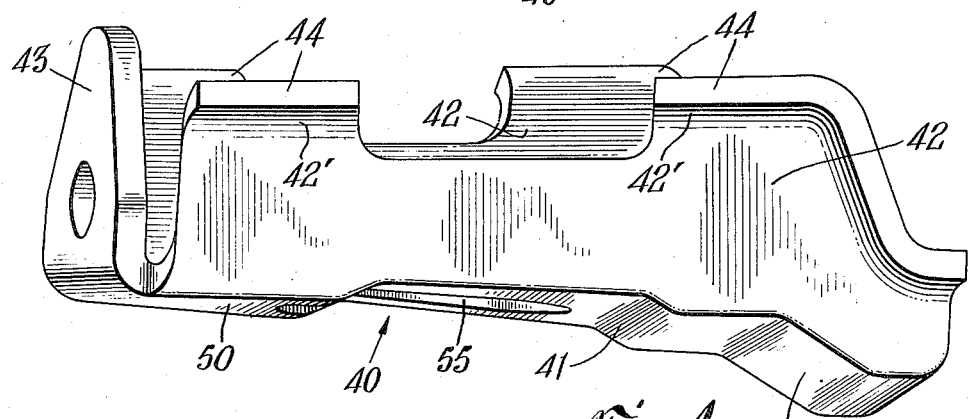
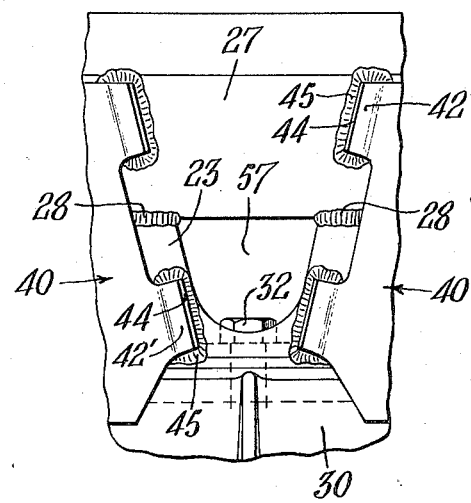
INVENTOR
CHARLES S. ASH
BY
Morgan, Finnegan + Durham
ATTORNEYS Jan. 9, 1951 C. S. ASH 2,537,180
VEHICLE WHEEL
Filed June 15, 1946 5 Sheets-Sheet 4

INVENTOR
CHARLES S. ASH
BY
Morgan, Finnegan & Durka
ATTORNEYS

Jan. 9, 1951  C. S. ASH  2,537,180
VEHICLE WHEEL
Filed June 15, 1946  5 Sheets-Sheet 5
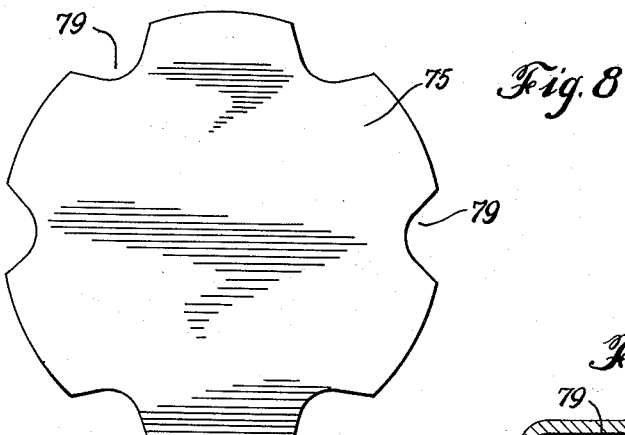
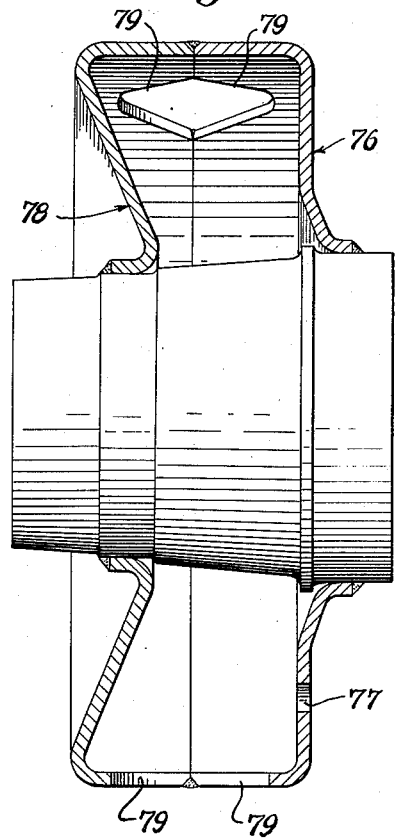
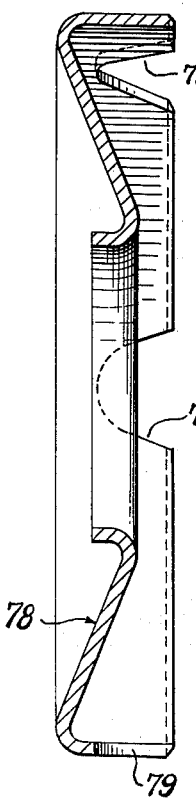
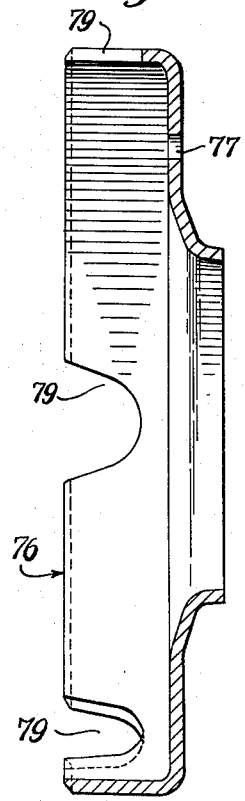
INVENTOR.
CHARLES S. ASH
BY
Morgan, Finnegan & Durham
ATTORNEYS.

Patented Jan. 9, 1951

2,537,180

UNITED STATES PATENT OFFICE 2,537,180

VEHICLE WHEEL

Charles S. Ash, Milford, Mich.

Application June 15, 1946, Serial No. 677,012

18 Claims. (Cl. 301—13)

The present invention relates to improvements in vehicle wheels, and more particularly to such wheels adapted to demountably mount a plurality of road engaging tires.

Objects and advantages of the invention will be set forth in part hereinafter and in part will be obvious herefrom, or may be learned by practice with the invention, the same being realized and attained by means of the instrumentalities and combinations pointed out in the appended claims.

The invention consists in the novel parts, constructions, arrangements, combinations and improvements herein shown and described.

The accompanying drawings, referred to herein and constituting a part hereof, illustrate one embodiment of the invention, and together with the description, serve to explain the principles of the invention.

Of the drawings:

Figure 3 is a plan view of a wheel spoke of the wheel shown in Figures 1 and 2, viewed along line 3—3 of Figure 2;

Figure 4 is a perspective view of a wheel spoke of the embodiment of the invention shown in Figures 1 and 2, the spoke having been formed for assembly but shown separately and unassembled with the remainder of the wheel;

Figure 5 is a plan view of the embodiment of the invention shown in the first two figures, viewed along line 5—5 of Figure 2;

Figure 8 is an elevation of a web blank for a further embodiment of the present invention from which both the inner and outer web portions of the wheel may be formed;

Figure 9 is a cross-sectional view of the inner web portion of the wheel formed of a web blank such as that shown in Figure 8;

Figure 10 is a cross-sectional view of the outer web portion of the wheel formed likewise of a web blank such as that shown in Figure 8; and Figure 11 is a cross-sectional view of the wheel formed of the assembled web portions shown in Figures 9 and 10.

The present invention has for its object the provision of a vehicle wheel of the type adapted to carry a pair of rims demountably mounted thereon whereby dual pneumatic tires are carried by the wheel assembly, and is particularly suited for use on heavy duty vehicles such as trucks, trailers and busses. A further object of the invention is the provision of a vehicle wheel of the type just described which is extremely strong and at the same time relatively simple and economical to fabricate.

In general, the present invention may be said to utilize some of the improvements and advantages disclosed in my United States Patent Number 2,355,941 issued August 15, 1944 for the provision of a dual tired vehicle wheel. The patent referred to discloses a bogie wheel of great strength and simplicity of design, and may be referred to as supplementing the present disclosure in so far as common or similar elements and fabrication methods are involved, particular reference being had to the embodiment of Figure 3 of that patent. The present invention, however, provides a wheel for an entirely different purpose in that it is adapted to carry a plurality of demountable road engaging elements and braking means, and the problems presented and solved and the inventions involved are separate and distinct.

Figure 1:
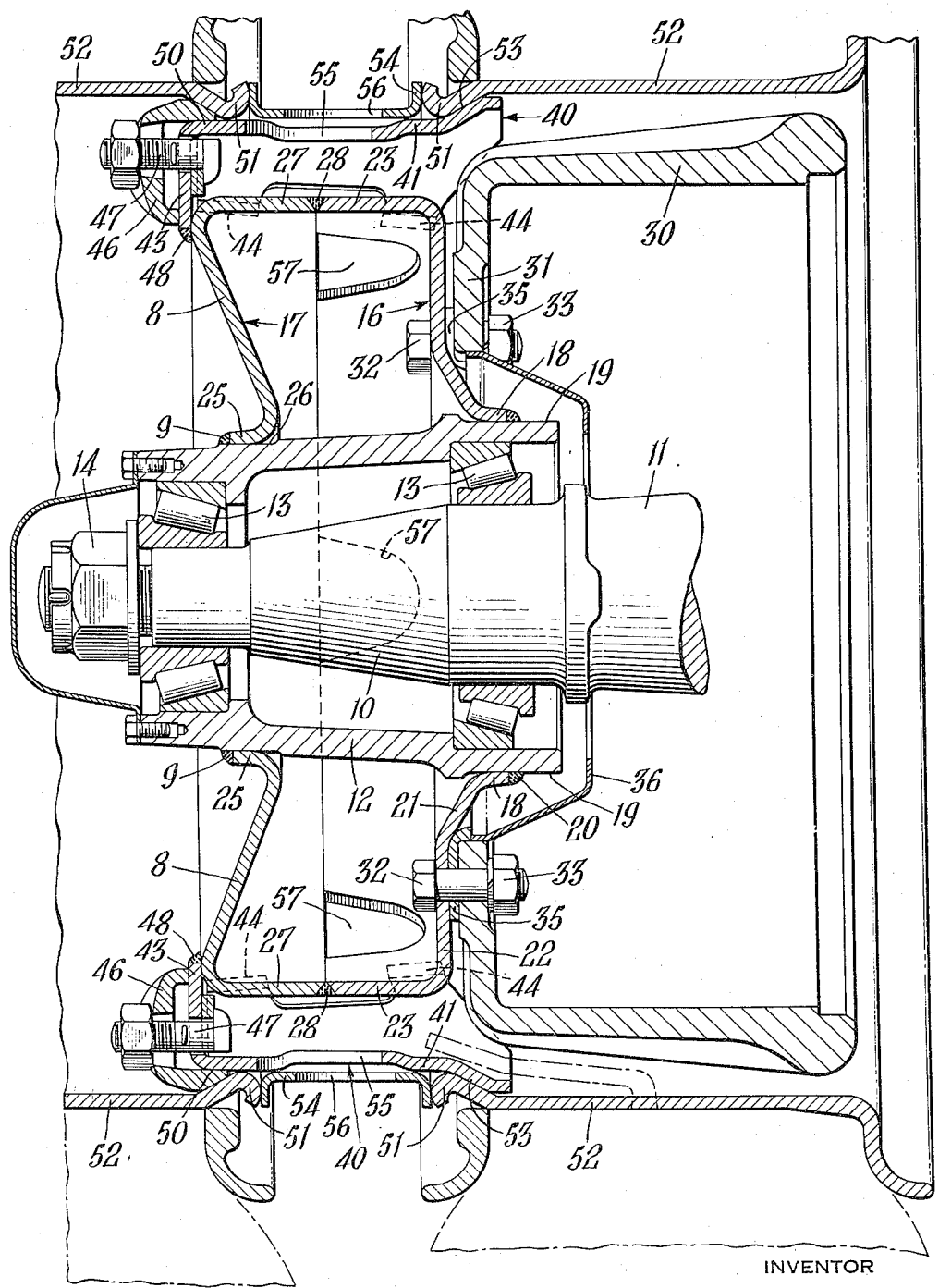
Figure 1 is a cross-sectional view of a typical and illustrative embodiment of the present invention taken along line 1—1 of Figure 2.
Figure 2:
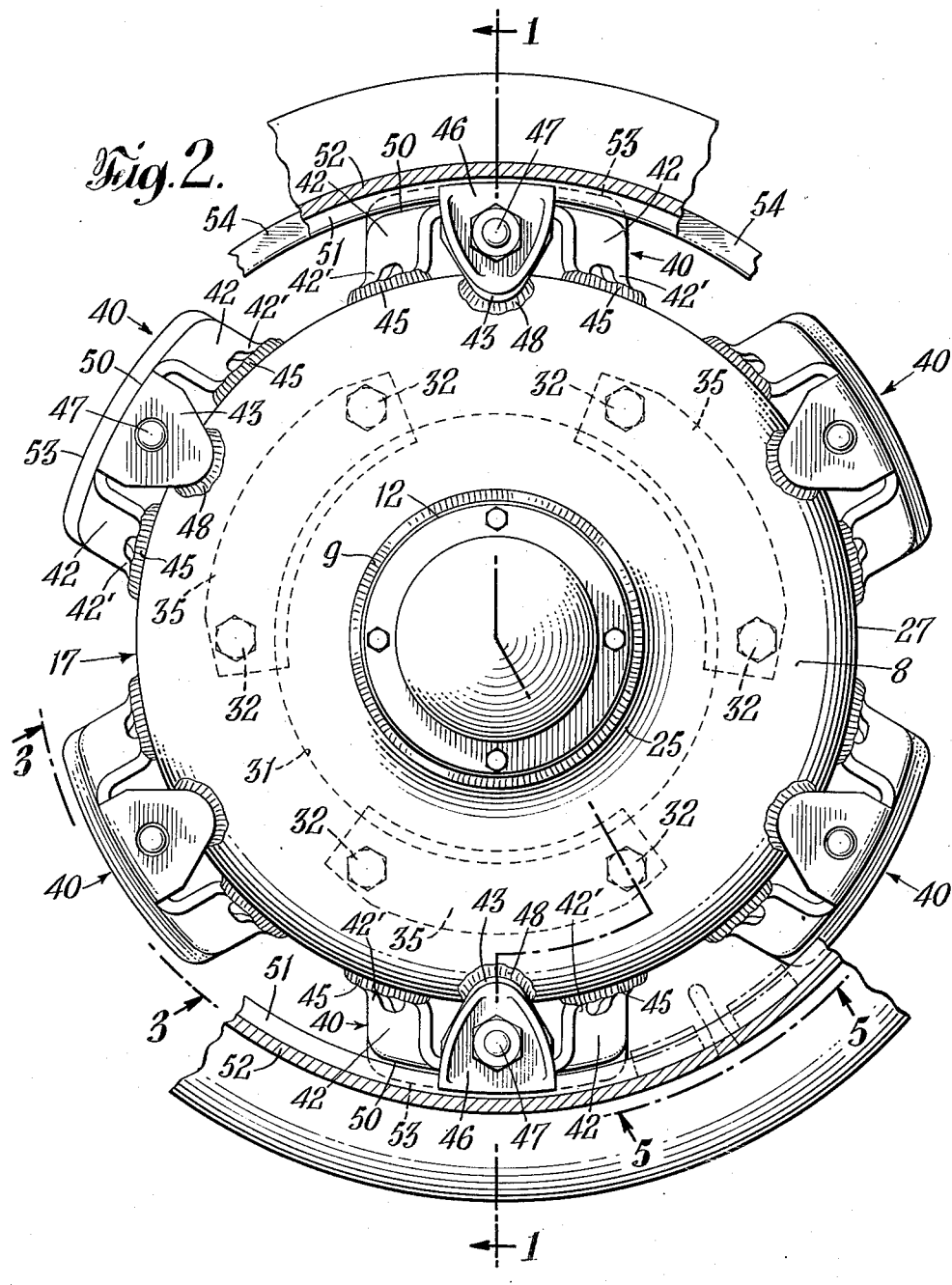
Figure 2 is an elevation of the embodiment of the invention shown in Figure 1 viewed inwardly toward the wheel from the outer end thereof, certain portions of the demountable rims being broken away.

Referring now in detail to the illustrative embodiments of the present invention shown by way of example in the accompanying drawings, and referring first to the embodiment of Figures 1 and 2, the vehicle wheel is shown as mounted on the reduced end or spindle 10 of a vehicle axle 11. The vehicle wheel is provided with a tubular hub element 12, and this is mounted in conventional fashion upon spindle 10 by means of antifriction bearings 13, the hub and bearing assembly being held in place by nut 14 on the end of the axle.

The central body portion of the wheel is formed of a pair of elements which may be made from single flat circular discs of metal and formed by stamping or drawing operation. As shown in Figure 1 of the drawings, these elements comprise the inner and outer web elements 16 and 17 respectively. The inner element 16 is formed as shown at its inner periphery with a short integral cylindrical portion 18 adapted to seat on the finished outer cylindrical surface 19 of hub 12 and preferably have a tight press fit thereon. The elements are joined by a circular weld 20 at the end of cylindrical portion 18.

Immediately radially outwardly of its portion 18 the web element 16 is formed in a frustoconical portion 21 to contribute greater strength to the composite wheel structure. Through its central and outer portion element 16 is formed in a portion 22 which lies substantially in a radial plane of the wheel, and portion 22 merges or turns into an extended cylindrical portion 23 at the outer periphery of the web element.

The outer web element 17 of the wheel body is somewhat similarly, but even more simply, formed, having an inner peripheral, outwardly axially turned cylindrical portion 25 tight, press fitted on finished external surface 26 of hub 12 and welded thereto as indicated at 9. The entire radial extent of web element 17 is formed as a frusto-conical portion 8, integral radially inwardly with portion 25 just described, and integral radially outwardly with an axially inwardly turned extended cylindrical portion 27, which is coaxial with and of equal diameter to the portion 23 of the inner web element 16. Cylindrical portions 23 and 27 are thus arranged to have abutting ends, which are externally beveled to receive a strong circular weld 28 between the parts.

Braking means are provided for the wheel, and as embodied comprise a brake drum 30 of a conventional type, having an inwardly radially extending head or flange portion 31 by which the drum is secured to the plane portion 22 of inner web element 16 by means of a plurality of bolts 32 and nuts 33. However, as best shown in Figure 2 of the drawings, a plurality of semi-circular spacing elements 35 (three in the illustrative embodiment shown) are provided between drum flange 31 and web element 16, each apertured to receive a pair of the drum mounting bolts 32. The ends of each spacing element 35 are spaced apart from the ends of the adjacent element, providing paths for excess lubricant from the wheel bearings radially outwardly of the wheel between the brake drum flange and web element 16. An annular deflector member 36 is secured to drum flange 31 and is formed as shown to catch excess bearing lubricant, channelling it outwardly as just described and preventing its access to the interior of the brake.

There has thus far been described a strong and simply fabricated hub, body and braking means assembly, for a vehicle wheel, and there are further provided means for mounting dual demountable tires on the wheel allowing for adequate ventilation of the brake drum. As shown in detail in Figures 3 and 4 of the drawings the spoke members designated generally by the numeral 40 may be simply formed from a flat blank of metal to provide a tapered or wedge shaped configuration as viewed from the top with top, or spoke end, surfaces 41, side walls 42 and end walls 43. The side walls 42 are formed with legs 42' extending radially inwardly and provided with portions 44 outwardly flared to cooperating curve with and seat upon the peripheral cylindrical portions 23 and 27 of web elements 16 and 17 respectively. A plurality of spoke members 40 are circumferentially spaced about the periphery of composite wheel body portion 16—17, each being axially disposed along the cylindrical wall 23—27 and welded thereto at turned portions 44 as indicated by numeral 45.

The end walls 43 of spokes 40 are formed to lie in a substantially radial plane to form seats for rim mounting lugs 46, being apertured to receive lug bolts 47. The spokes are also welded to outer web element 17 by means of these end walls, as indicated at 48.

The outer radial spoke end surfaces 41 are formed at their axially outer extent in plane surfaces 50 to receive the axially extending portions of lugs 46 and the inwardly turned bead or shoulder 51 of an outer pneumatic tire rim 52. The axially inner extent of spoke end surfaces 41 are formed with inclined surfaces 53 against which the shoulder 51 of an inner rim 52 is adapted to seat. A cylindrical spacing member 54 is positioned over the central portions of the spoke members 40 and engages both rims 52 at their shoulders 51, cooperating with lugs 46 and inclined spoke surfaces 53 to securely but removably mount the rims on the vehicle wheel.

From the foregoing description it will be apparent that the spoke members 40 provide strong, simply fashioned mountings for the duplicate rims 52 for the tires, and that in fabricating the wheel different wheel sizes may be made using the same hub and web element composite structure simply by providing spokes of different radial heights. The tapered or wedge shape of the spokes provides a rear seat 53 of substantial extent upon which to seat the inner of the tire rims 52, and there is likewise provided an angular welded engagement at 45 between legs 43 of the spokes and cylindrical portion 23—27 of the wheel body, which contributes materially to the strength of the structure.

It will be noted that an aperture 55 is provided in the central portion of each spoke end surface 41, and that the spacing member 54 is similarly provided with apertures 56 registering with said apertures 55. Ventilation is thus afforded between the tires, through the spokes and out the open, axially inner end thereof over the brake drum, and air communication within the spoke is further provided between legs 43 of side walls 42. Furthermore, direct ventilation for the brake drum is had between the spokes 40 over the cylindrical peripheral portion 23—27 of the wheel body, and the angular relationship of the walls 42 with respect to the axis of the wheel provides a pumping action for ventilation of the brake drum.

The inner web element 16 is provided with a curved aperture 57 positioned between each pair of spokes so that access may be had to the interior of the wheel and the heads of bolts 32 which mount drum 30 on the wheel. The apertures further serve to ventilate the interior of the wheel and prevent excessive heat.

Figure 6:
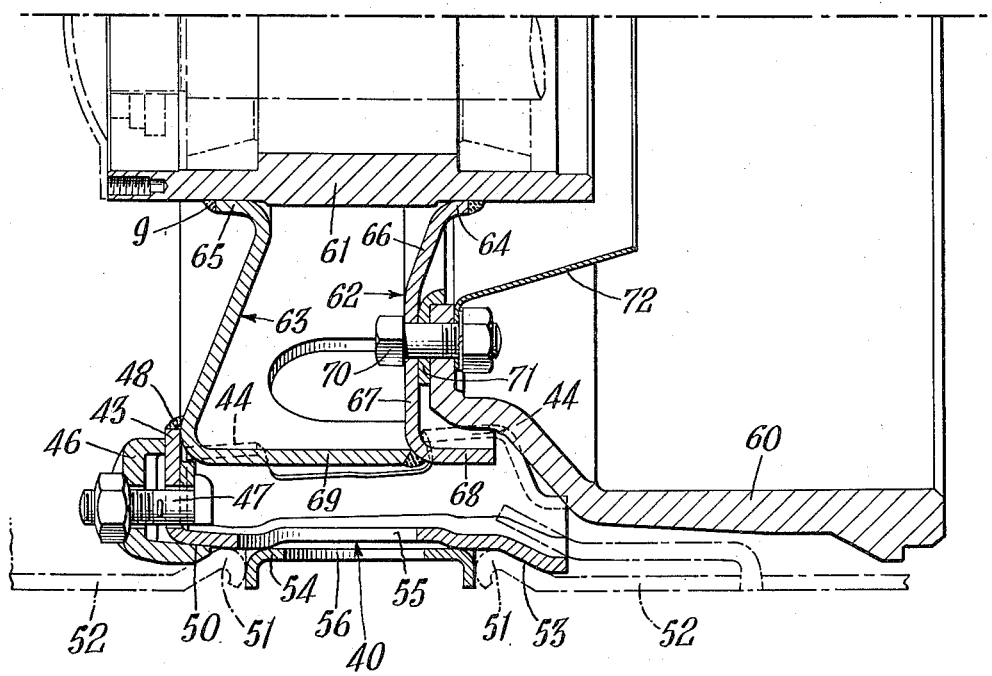
Figure 6 is a cross-sectional view of a second embodiment of the present invention (only so much of the structure being shown as lies on one side of the axis of the wheel), taken along line 6—6 of Figure 7.
Figure 7:
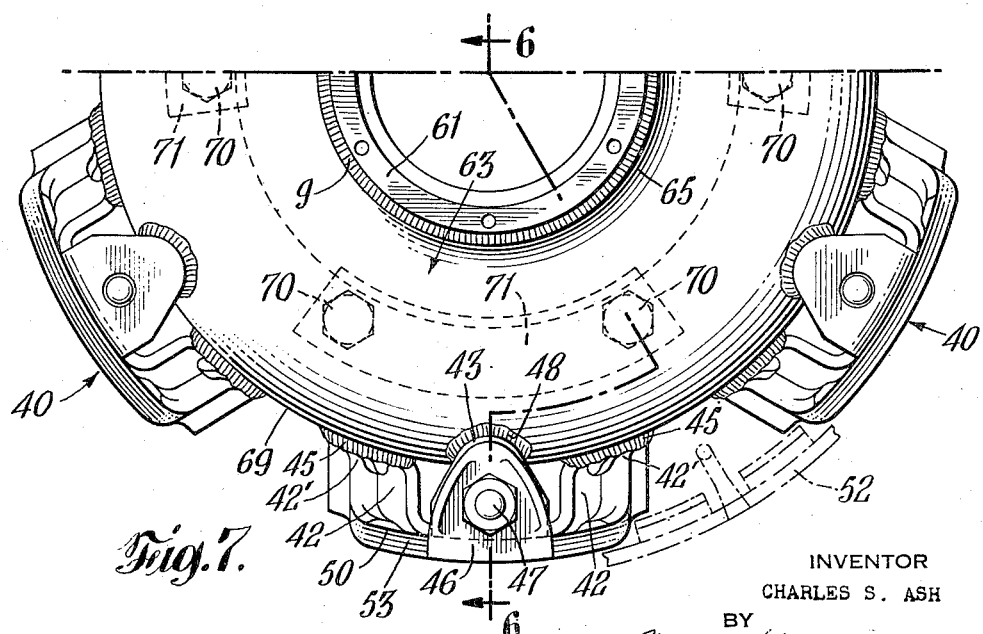
Figure 7 is an elevation of the embodiment of the invention shown in Figure 6, viewed inwardly toward the wheel from the outer end thereof.

The embodiment of the invention shown in Figures 6 and 7 of the drawings is generally similar to that just described, except that the wheel is adapted to receive a brake drum 60 of a type conventionally used with wheels of the demountable at the hub type, the so-called Budd wheels. The drum 60 is of somewhat greater axial length than the drum 30 in the embodiment of the invention already described, and a modification in the body portion of the wheel is effected to receive the drum.

As shown, the wheel comprises a tubular hub 61 and inner and outer web elements 62 and 63 respectively. The inner web 62 is provided with an inner short cylindrical portion 64 seated on and welded to the external surface of hub 61, and the outer web element has a similar but oppositely turned portion 65. The inner web immediately radially outwardly of portion 64 is formed frusto-conically at 66 for strength, which merges into a portion 67 extending substantially in a radial plane of the wheel. At the outer periphery of the web is integral cylindrical portion 68 which, together with the cylindrical peripheral portion 69 of web element 63, forms a cylindrical surface of the wheel body of sufficient length to receive spokes such as those already described for the embodiments of Figures 1 and 2. In this instance it will be noted that the web cylindrical portions 68 and 69 are turned in the same axial direction, but the underlying principles of the construction are the same. The mounting of drum 60 is accomplished by means of bolts 70 through plane portions 67 of the inner web element, and semi-circular spacers 71 are again provided to allow escape of excess lubricant deflected by grease catcher 72.

In other respects the embodiment of the invention shown in Figures 6 and 7 of the drawings is entirely similar to the embodiment of Figures 1 and 2, and it is thought that the structure thereof will be clear from the drawings and the description already offered.

In Figure 8 of the drawings there is shown a web blank 75 from which both the inner and outer web elements of a modified embodiment of the invention may be formed, thus effecting considerable saving in fabrication costs of the wheel. In Figure 9 there is shown an inner web element 76 formed from the blank shown in Figure 8, apertures 77 having been drilled to accommodate brake drum mounting bolts. The outer web element 78 shown in Figure 10 is likewise formed of a blank such as that shown in Figure 8. Peripheral notches 79 are provided in the blank 75, and these, when brought into registering relationship as shown in Fig. 11 upon assembly of the formed web elements 76 and 78, provide apertures in the periphery of the wheel body allowing access to brake drum mounting bolts and likewise affording adequate ventilation for cooling the wheel body. The wheel body of the embodiment of the invention shown in Figures 8, 9 and 10 is assembled as already described and shown for the preceding embodiments of the invention, there being provided a suitable hub element, brake drum, spoke members, and other elements entirely similar to those described.

The invention in its broader aspects is not limited to the specific mechanisms shown and described but departures may be made therefrom within the scope of the accompanying claims without departing from the principles of the invention and without sacrificing its chief advantages.

What I claim is:

1. A vehicle wheel comprising an elongated hub, a pair of webs secured to the hub in spaced apart relationship, said webs having integral axially turned portions at their outer peripheries abutting and secured together to provide an axially extending susbtantially continuous circumferential surface, and a plurality of hollow box-like axially and radially extending spoke members circumferentially spaced apart and secured to said surface, said spoke members having axially inner and outer surfaces to receive respective tire rims, said axially inner surfaces being inclined.

2. A vehicle wheel comprising an elongated hub, a pair of webs secured to the hub in spaced apart relationship, said webs having integral axially turned portions at their outer peripheries secured together to provide an axially extending substantially continuous circumferential surface, and a plurality of axially and radially extending hollow spoke members having partially open side walls and open axially inner ends, said members being circumferentially spaced apart and secured to said surface.

3. A vehicle wheel comprising an elongated hub, a pair of webs secured to the hub in spaced apart relationship, said webs having integral axially turned portions at their outer peripheries secured together to provide an axially extending substantially continuous circumferential surface, and a plurality of axially and radially extending hollow spoke members, said members being axially tapered with the broader portion axially inwardly of the wheel and being welded to said surface along lines angularly related to the axis of the wheel.

4. A vehicle wheel comprising an elongated hub, a pair of webs secured to the hub in spaced apart relationship, said webs having integral axially turned portions at their outer peripheries secured together to provide an axially extending substantially continuous circumferential surface, the axially inner of said webs having a plane portion lying in substantially a radial plane of the wheel, a brake drum having a flange secured by mounting bolts to said plane portion of said one web, and a plurality of axially and radially extending spoke members circumferentially spaced apart and secured to said surface, said surface having spaced apertures between said spoke members whereby access is had to said drum mounting bolts.

5. A vehicle wheel comprising an elongated hub, a pair of webs secured to the hub in spaced apart relationship, said webs having integral axially turned portions at their outer peripheries secured together to provide an axially extending substantially continuous circumferential surface, and a plurality of axially and radially extending hollow spoke members circumferentially spaced apart and secured to said surfaces, each said spoke member being made from a single blank of material formed to provide a plane axially outer wall to seat a rim mounting lug, a pair of partially open axially extending side walls, and a top wall having axially inner and outer surfaces to receive respective tire rims the former of which is inclined, each said spoke being entirely open at its axially inner end.

6. A vehicle wheel comprising an elongated hub, a pair of webs secured to the hub in spaced apart relationship, said webs having integral axially turned portions at their outer peripheries secured together to provide an axially extending substantially continuous circumferential surface, a plurality of axially and radially extending hollow spoke members circumferentially spaced apart and secured to said surface, each said spoke member being made from a single blank of material formed to provide a plane axially outer wall to seat a rim mounting lug, a pair of partially open axially extending side walls, a top wall having axially inner and outer surfaces to receive respective tire rims the former of which is inclined, each said spoke being entirely open at its axially inner end, and a brake drum having a flange secured to the axially inner of said webs.

7. A vehicle wheel comprising an elongated hub, a pair of webs secured to the hub in spaced apart relationship, said webs having integral axially turned portions at their outer peripheries secured together to provide an axially extending substantially continuous circumferential surface, a plurality of axially and radially extending hollow spoke members circumferentially spaced apart and secured to said surface, each said spoke member having partially open side walls and top wall and being entirely open at the axially inner end thereof, means for mounting a pair of tire rims on said spoke members including a cylindrical spacing ring having apertures therein to register with open portions of said spoke member top walls, and a brake drum having a flange secured to the axially inner of said webs.

8. A vehicle wheel comprising an elongated hub, a pair of webs secured to the hub in spaced apart relationship said webs having integral axially turned portions at their outer peripheries secured together to provide an axially extending substantially continuous circumferential surface, a brake drum having an inwardly radially extending attaching flange secured to the axially inner of said webs, a plurality of circumferentially spaced semi-circular spacing members between said flange and said inner web providing paths between their ends for lubricant escape, a deflector member secured to said flange for directing excess lubricant toward said paths, and a plurality of axially and radially extending hollow spoke members circumferentially spaced apart and secured to said surface.

9. A vehicle wheel comprising an elongated hub, a pair of annular webs having integral cylindrical portions at their inner peripheries welded to said hub in spaced apart relationship, the axially outer of said webs having a frusto-conical formation throughout its entire radial extent and terminating at its outer periphery in an integral axially turned cylindrical portion, the axially inner web having a radially extending frusto-conical portion adjacent its inner periphery merging into a plane portion lying substantially in a radial plane of the wheel extending to its outer periphery and having an integral axially turned cylindrical portion at its outer periphery abutting and welded to said outer peripheral cylindrical portion of said outer web, said outer peripheral cylindrical portions providing an axially extending substantially continuous circumferential surface, and a plurality of axially and radially extending hollow spoke members circumferentially spaced apart and welded to said surface.

10. A vehicle wheel comprising an elongated hub, a pair of annular webs having integral cylindrical portions at their inner peripheries welded to said hub in spaced apart relationship, the axially outer of said webs having a frusto-conical formation throughout its entire radial extent and terminating at its outer periphery in an integral axially turned cylindrical portion, the axially inner web having a radially extending frusto-conical portion adjacent its inner periphery merging into a plane portion lying substantially in a radial plane of the wheel extending to its outer periphery and having an integral axially turned cylindrical portion at its outer periphery abutting and welded to said outer peripheral cylindrical portion of said outer web, said outer peripheral cylindrical portions providing an axially extending substantially continuous circumferential surface, a plurality of axially and radially extending hollow spoke members circumferentially spaced apart and welded to said surface, and a brake drum having a mounting flange secured to said plane radial portion of said axially inner web.

11. A vehicle wheel comprising an elongated hub, a pair of webs secured to the hub in spaced apart relationship, said webs having integral cylindrical portions at their outer peripheries axially turned toward the center of the wheel and joined at their adjacent ends, said portions providing an axially extending substantially continuous circumferential surface, and a plurality of axially and radially extending hollow spoke members circumferentially spaced apart and secured to said surface.

12. A vehicle wheel comprising an elongated hub, a pair of webs secured to the hub in spaced apart relationship, the axially inner of said webs having an integral cylindrical portion axially inwardly turned at its outer periphery, the axially outer web having an integral cylindrical portion axially inwardly turned at its outer periphery extending and secured to said cylindrical portion of said inner web, said cylindrical portions providing an axially extending substantially continuous circumferential surface, and a plurality of axially and radially extending hollow spoke members circumferentially spaced apart and secured to said surface.

13. A vehicle wheel comprising an elongated hub, a pair of webs, formed of duplicate blanks, secured to the hub in spaced apart relationship, said webs having integral axially turned portions at their outer peripheries secured together to provide an exterior substantially cylindrical surface, and a plurality of axially and radially extending spoke members circumferentially spaced apart and secured to said cylindrical surface.

14. A vehicle wheel comprising an elongated hub, a pair of webs secured to the hub in spaced apart relationship, said webs being formed of identical flat annular blanks of material having circumferentially spaced peripheral notches, said webs having integral axially turned portions at their outer peripheries secured together with said notches in registering relationship, said turned portions providing an axially extending substantially continuous circumferential surface, a brake drum having a flange secured by mounting bolts to the axially inner of said webs, said registering notches providing peripheral apertures in said circumferential surface for access to the drum mounting bolts, and a plurality of axially and radially extending spoke members circumferentially spaced apart and secured to said surface.

15. A vehicle wheel comprising an elongated hub, a pair of webs secured to the hub in spaced apart relationship, said webs having integral cylindrical portions at their outer peripheries axially turned toward each other and joined at their adjacent ends, said portions providing an axially extending substantially continuous cirumferential surface, and a plurality of axially and radially extending hollow spoke members circumferentially spaced apart and secured to said surface, said spoke members being formed with radially outer surfaces for receiving a pair of tire rims.

16. A vehicle wheel comprising an elongated hub, a pair of webs secured to the hub in spaced apart relationship, said webs having integral cylindrical portions at their outer peripheries axially turned toward each other and joined at their adjacent ends, said portions providing an axially extending substantially continuous circumferential surface, and a plurality of axially and radially extending hollow spoke members circumferentially spaced apart and secured to said surface, said spoke members having axially inner and outer surfaces to receive respective tire rims, said axially inner surfaces being inclined.

17. A vehicle wheel comprising an elongated hub, a pair of webs secured to the hub in spaced apart relationship, the axially inner of said webs having an integral cylindrical portion axially inwardly turned at its outer periphery, the axially outer web having an integral cylindrical portion axially inwardly turned at its outer periphery extending and secured to said cylindrical portion of said inner web, said cylindrical portions providing an axially extending substatially continuous circumferential surface, and a plurality of axially and radially extending hollow spoke members circumferentially spaced apart and secured to said surface, said spoke members being formed with radially outer surfaces for receiving a pair of tire rims.

18. A vehicle wheel comprising an elongated hub, a pair of webs secured to the hub in spaced apart relationship, the axially inner of said webs having an integral cylindrical portion axially inwardly turned at its outer periphery, the axially outer web having an integral cylindrical portion axially inwardly turned at its outer periphery extending and secured to said cylindrical portion of said inner web, said cylindrical portions providing an axially extending substantially continuous circumferential surface, and a plurality of axially and radially extending hollow spoke members circumferentially spaced apart and secured to said surface, said spoke members having axially inner and outer surfaces to receive respective tire rims, said axially inner surfaces being inclined.

CHARLES S. ASH.

REFERENCES CITED

The following references are of record in the file of this patent:

UNITED STATES PATENTS

| Number | Name | Date |
|---|---|---|
| 1,327,607 | Baker | Jan. 13, 1920 |
| 1,404,411 | Schenck | Jan. 24, 1922 |
| 1,761,928 | Main | June 3, 1930 |
| 2,033,958 | Sauzedde | Mar. 17, 1936 |
| 2,150,810 | Slick | Mar. 14, 1939 |
| 2,158,709 | Trumble | May 16, 1939 |

FOREIGN PATENTS

| Number | Country | Date |
|---|---|---|
| 545,776 | France | 1922 |
| 633,369 | Germany | July 25, 1936 |